United States Patent
Ito et al.

(10) Patent No.: US 8,839,917 B2
(45) Date of Patent: Sep. 23, 2014

(54) DISC BRAKE APPARATUS

(75) Inventors: Takahiro Ito, Chiryu (JP); Takao Iida, Toyota (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 230 days.

(21) Appl. No.: 13/256,252

(22) PCT Filed: Nov. 16, 2010

(86) PCT No.: PCT/JP2010/070383
§ 371 (c)(1),
(2), (4) Date: Sep. 13, 2011

(87) PCT Pub. No.: WO2011/062160
PCT Pub. Date: May 26, 2011

(65) Prior Publication Data
US 2012/0024641 A1 Feb. 2, 2012

(30) Foreign Application Priority Data
Nov. 17, 2009 (JP) ................. 2009-261730

(51) Int. Cl.
*F16D 55/22* (2006.01)
*F16D 65/097* (2006.01)

(52) U.S. Cl.
CPC ........ *F16D 65/0978* (2013.01); *F16D 65/0972* (2013.01)
USPC ................. 188/72.1; 188/1.11 W; 188/73.31; 188/73.36; 188/73.37; 188/73.39; 188/73.45; 188/250 F; 188/250 G; 188/234

(58) Field of Classification Search
CPC . F16D 55/24; F16D 55/227; F16D 55/22655; F16D 55/2265; F16D 65/40; F16D 65/18; F16D 65/0971; F16D 65/0006; F16D 65/0977; F16D 65/0972; F16D 65/92; F16D 65/0978; F16D 65/0979; B60T 13/741
USPC .............. 188/72.1, 72.2, 73.36, 73.38, 73.31, 188/73.44, 73.37, 73.9, 1.11 W, 196 R
IPC ........................................... F16D 55/24, 65/40
See application file for complete search history.

(56) References Cited

U.S. PATENT DOCUMENTS

| 4,444,296 | A | | 4/1984 | Marianu |
|---|---|---|---|---|
| 4,460,067 | A | * | 7/1984 | Katagiri et al. .......... 188/1.11 W |
| 6,003,642 | A | * | 12/1999 | Mori et al. ................ 188/73.44 |
| 7,152,717 | B2 | * | 12/2006 | Lelievre et al. ............ 188/73.38 |
| 2005/0274579 | A1 | * | 12/2005 | Nogiwa ..................... 188/73.38 |
| 2007/0261927 | A1 | * | 11/2007 | Iraschko et al. ........... 188/73.38 |
| 2008/0135353 | A1 | | 6/2008 | Takeo et al. |
| 2009/0159376 | A1 | | 6/2009 | Rossignol et al. |

FOREIGN PATENT DOCUMENTS

| JP | 56-129624 U | 10/1981 |
|---|---|---|
| JP | 51-140934 A | 8/1982 |
| JP | 57-179438 A | 11/1982 |
| JP | 57-200739 A | 12/1982 |
| JP | 58-065443 U | 5/1983 |
| JP | 59-081827 U | 6/1984 |
| JP | 10-331883 A | 12/1998 |
| JP | 2000-110862 A | 4/2000 |
| JP | 2000-220670 A | 8/2000 |
| JP | 2002-039238 A | 2/2002 |
| JP | 4061736 B2 | 3/2008 |
| JP | 2008-144889 A | 6/2008 |
| JP | 2009-150539 A | 7/2009 |

OTHER PUBLICATIONS

International Search Report (PCT/ISA/210) issued on Dec. 28, 2010, by Japanese Patent Office as the International Searching Authority for International Application No. PCT/JP2010/070383.
Written Opinion (PCT/ISA/237) issued on Dec. 28, 2010, by Japanese Patent Office as the International Searching Authority for International Application No. PCT/JP2010/070383.

* cited by examiner

*Primary Examiner* — Robert A Siconolfi
*Assistant Examiner* — San Aung
(74) *Attorney, Agent, or Firm* — Buchanan Ingersoll & Rooney PC

(57) ABSTRACT

An object is to stably exhibit a two-stage spring characteristic of a plate spring for restraining the generation of a clonk noise in a disc brake apparatus for use in a vehicle. A plate spring 90 for restraining the generation of a clonk noise has a fixture portion 91 having a shape resembling the squarish letter U and elastically fixed to a back plate 61, and an extension portion 92 extending continuously from the fixture portion 91. The extension portion 92 includes an engagement subportion 92a engaged with a support member at all times; a curved subportion 92b located between the engagement subportion 92a and the fixture portion 91; and a contact-engagement subportion 92c located between the curved subportion 92b and the fixture portion 91. The contact-engagement subportion 92c is located a predetermined distance away from the back plate 61 when the back plate 61 is at a non-braking position, and is elastically deformed together with the curved subportion 92b and comes into surface contact with the back plate 61 in a nonslip manner when the curved subportion 92b is elastically deformed by a predetermined amount from its non-braking condition as a result of the back plate 61 moving from the non-braking position toward the rotor-rotation trailing side and thus toward the support member.

5 Claims, 6 Drawing Sheets

DISC BRAKE APPARATUS

TECHNICAL FIELD

The present invention relates to a disc brake apparatus for use in a vehicle, and more particularly to a disc brake apparatus capable of restraining the generation of a contact noise (clonk noise) which results from back plates of brake pads coming into contact with a support member in backward braking of a vehicle subsequent to forward braking of the vehicle.

BACKGROUND ART

Generally, a disc brake apparatus of such a type includes a disc rotor which can rotate forward and in reverse unitarily with a wheel; a support member (e.g., a mounting or a stationary caliper) to be attached to a vehicle body; a pair of brake pads disposed in such a manner as to be able to grip the disc rotor therebetween and attached to the support member in such a manner as to be movable in the axial direction of the disc rotor and in the circumferential direction of the disc rotor; and pressing members (e.g., a piston attached to a caliper and a pressing arm provided on a movable caliper) for pressing the back plates of the brake pads toward the disc rotor. The disc brake apparatus further includes a plate spring which intervenes between the support member and an end portion of the back plate of each brake pad with respect to the circumferential direction of the disc rotor, the end portion being located on a rotor-rotation trailing side at the time of forward rotation of the disc rotor (at the time of rotation for forward movement of a vehicle), and which urges the brake pad toward a rotor-rotation leading side. In braking, the pressing member presses the brake pads toward the disc rotor, whereby the linings of the brake pads are slidably pressed against the braking surfaces of the disc rotor. By this procedure, the rotation of the disc rotor is braked. Such a disc brake apparatus is described in, for example, Patent Document 1 mentioned below.

PRIOR ART DOCUMENT

Patent Document

Patent Document 1: Japanese Patent Application Laid-Open (kokai) No. H10-331883

In the disc brake apparatus described in the above Patent Document 1, the plate spring has a fixture portion fixed to the back plate, and an extension portion which extends continuously from the fixture portion. The extension portion has an engagement subportion engaged with the support member at all times; a curved subportion located between the engagement subportion and the fixture portion; and a contact-engagement subportion, which is provided on the distal end side of the engagement subportion of the extension portion, is located a predetermined distance away from the back plate or the fixture portion when the back plate is at a non-braking position, and comes into slidable contact engagement with the back plate or the fixture portion through its inclined surface when the curved subportion is elastically deformed by a predetermined amount from its non-braking condition as a result of the back plate moving from the non-braking position toward the rotor-rotation trailing side and thus toward the support member.

Thus, in the disc brake apparatus described in the above Patent Document 1, the plate spring provides the following two-stage spring characteristic: a characteristic determined by its small spring constant (a characteristic exhibited until the contact-engagement subportion comes into slidable contact engagement with the back plate or the fixture portion through its inclined surface as a result of the curved subportion and the contact-engagement subportion being elastically deformed by respectively predetermined amounts from a non-braking condition) and a characteristic determined by its large spring constant (a characteristic exhibited when, in a state in which the contact-engagement subportion is slidably contact-engaged with the back plate or the fixture portion through its inclined surface, the curved subportion is further elastically deformed). Therefore, while the sliding resistance of the brake pads in the axial direction of the rotor in braking is restrained to a low level by means of the characteristic determined by its small spring constant, the generation of the above-mentioned contact noise (clonk noise) can be effectively restrained by means of the characteristic determined by its large spring constant.

SUMMARY OF THE INVENTION

The disc brake apparatus described in the above-mentioned Patent Document 1 employs the configuration in which the contact-engagement subportion of the plate spring comes into slidable contact engagement with the back plate or the fixture portion through its inclined surface. Thus, adhesion of oil or wear particles to the contact-engagement subportion causes variation in the friction coefficient thereof. Therefore, the two-stage spring characteristic of the plate spring becomes unstable, potentially resulting in a failure to yield an expected action and an expected effect.

The present invention has been conceived to solve the problem mentioned above and is characterized in that, in the above-mentioned disc brake apparatus, while the plate spring has a fixture portion fixed to the back plate, and an extension portion which extends continuously from the fixture portion, the extension portion includes an engagement subportion engaged with the support member at all times; a curved subportion located between the engagement subportion and the fixture portion; and a contact-engagement subportion which is located a predetermined distance away from the back plate or the fixture portion when the back plate is at a non-braking position, and comes into surface contact with the back plate or the fixture portion in a nonslip manner when the curved subportion is elastically deformed by a predetermined amount from its non-braking condition as a result of the back plate moving from the non-braking position toward the rotor-rotation trailing side and thus toward the support member.

In this case, the contact-engagement subportion can be formed at the proximal end of the extension portion in the proximity of the fixture portion. In this case, the contact-engagement subportion can have a pierced hole or a cutout (the small spring constant; i.e., the characteristic determined by the small spring constant, can be easily changed). Also, the contact-engagement subportion may be provided on the distal end side of the engagement subportion of the extension portion.

In the disc brake apparatus according to the present invention, when braking is performed while a vehicle is traveling forward (hereinafter such braking will be referred to as "forward braking"), the disc rotor rotating forward is gripped between the brake pads, whereby the rotation of the disc rotor is braked. Thus, at this time, the brake pads do not move toward the rotor-rotation trailing side for the forward rotation of the disc rotor, and the curved subportion and the contact-engagement subportion of the plate spring are maintained in a non-braking condition. In this condition, since the contact-engagement subportion of the plate spring is located a predetermined distance away from the back plate or the fixture portion and is thus allowed to move freely (allowed to be elastically deformable), the plate spring exhibits a characteristic determined by its small spring constant. Therefore, the sliding resistance of the brake pads in the axial direction of the disc rotor in forward braking is restrained to a low level.

Meanwhile, in the case where braking is performed while the vehicle is moving backward (hereinafter such braking will be referred to as "backward braking") subsequent to the forward braking, since the disc rotor rotating in the reverse direction is gripped between the brake pads for braking the rotation, the brake pads move toward the rotor-rotation trailing side for the forward rotation of the disc rotor. Thus, at this time, as a result of the movement of the brake pads, the curved subportion and the contact-engagement subportion of the plate spring are elastically deformed sequentially from their non-braking conditions. When the curved subportion and the contact-engagement subportion of the plate spring are elastically deformed by respectively predetermined amounts from their non-braking conditions, the contact-engagement subportion, whose free movement has been allowed, of the plate spring comes into surface contact with the back plate or the fixture portion of the plate spring in a nonslip manner, whereby the free movement of the contact-engagement subportion is restricted.

Thus, subsequently, the plate spring is deformed as follows: in a state in which the movement of the contact-engagement subportion of the plate spring is restricted by the back plate or the fixture portion of the plate spring (in a state in which the spring constant of the plate spring is increased as compared with the case where the movement of the contact-engagement subportion is not restricted by the back plate or the fixture portion), only the curved subportion of the plate spring is elastically deformed. Accordingly, in the early stage of the backward braking, the plate spring exhibits a characteristic determined by its small spring constant, whereby the sliding resistance of the brake pads in the axial direction of the disc rotor in braking can be restrained to a low level. In the latter stage of the backward braking, the plate spring exhibits a characteristic determined by its large spring constant, whereby the generation of a contact noise (clonk noise), which results from the back plates of the brake pads coming into contact with the support member, can be effectively restrained.

In the above-mentioned disc brake apparatus according to the present invention, in backward braking subsequent to the forward braking of a vehicle, the contact-engagement subportion of the plate spring which has been allowed to move freely comes into surface contact with the back plate or the fixture portion of the plate spring in a nonslip manner, whereby the free movement of the contact-engagement subportion is restricted; i.e., the characteristic of the plate spring is changed over from a characteristic determined by its small spring constant to a characteristic determined by its large spring constant. Meanwhile, even when oil or wear particles adhere to the contact-engagement subportion of the plate spring, the contact-engagement subportion yields an action and an effect similar to those yielded by the contact-engagement subportion free from adhesion of oil and wear particles. Therefore, the plate spring stably exhibits the two-stage spring characteristic, so that an expected action and an expected effect are yielded at all times.

MODES FOR CARRYING OUT THE INVENTION

Figure 1:
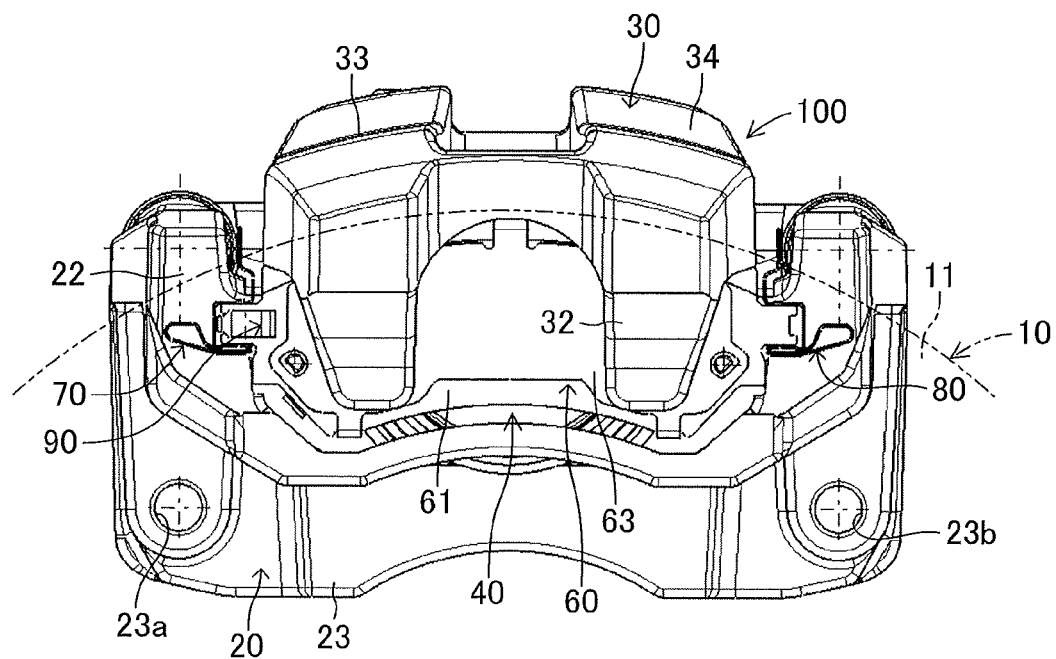
FIG. 1 Front view showing a disc brake apparatus according to an embodiment of the present invention.

An embodiment of the present invention will next be described with reference to the drawings. FIGS. 1 to 8 show an embodiment in which the present invention is embodied in a movable-caliper-type disc brake apparatus for use in a vehicle. A disc brake apparatus 100 of the present embodiment includes a disc rotor 10 (see FIG. 1) which is attached to an axle hub (an unillustrated rotating member) and can rotate forward and in reverse unitarily with a wheel (not shown); a support member (mounting) 20 to be attached to a vehicle body (not shown); a movable caliper 30 disposed in such a manner as to straddle a circumferential portion of the disc rotor 10 and attached to the support member 20 in such a manner as to be movable in the axial direction of the disc rotor 10; a single piston 40 attached to the movable caliper 30; an inner brake pad 50; and an outer brake pad 60.

The disc brake apparatus 100 further includes a pair of pad supports 70 and 80 attached to the support member 20, and plate springs 90 (circled in FIG. 2) which intervene between the support member 20 and end portions of the back plates 51 and 61 of the brake pads 50 and 60 with respect to the circumferential direction of the disc rotor 10, the end portions being located on a rotor-rotation trailing side (left side in FIG. 1) at the time of forward rotation of the disc rotor 10, and which urge the brake pads 50 and 60 toward a rotor-rotation leading side (right side in FIG. 1).

The disc rotor 10 has annular braking surfaces 11 which can be gripped between a lining 52 of the inner brake pad 50 and a lining 62 of the outer brake pad 60. In braking, the braking surfaces 11 are gripped between the lining 52 of the inner brake pad 50 and the lining 62 of the outer brake pad 60, thereby braking the rotation of the disc rotor 10. When a wheel is rotating forward, the disc rotor 10 rotates clockwise (forward rotation) in FIG. 1 unitarily with the wheel. In this case, the left side in FIG. 1 is a rotation trailing side, and the right side in FIG. 1 is a rotation leading side.

Figure 2:
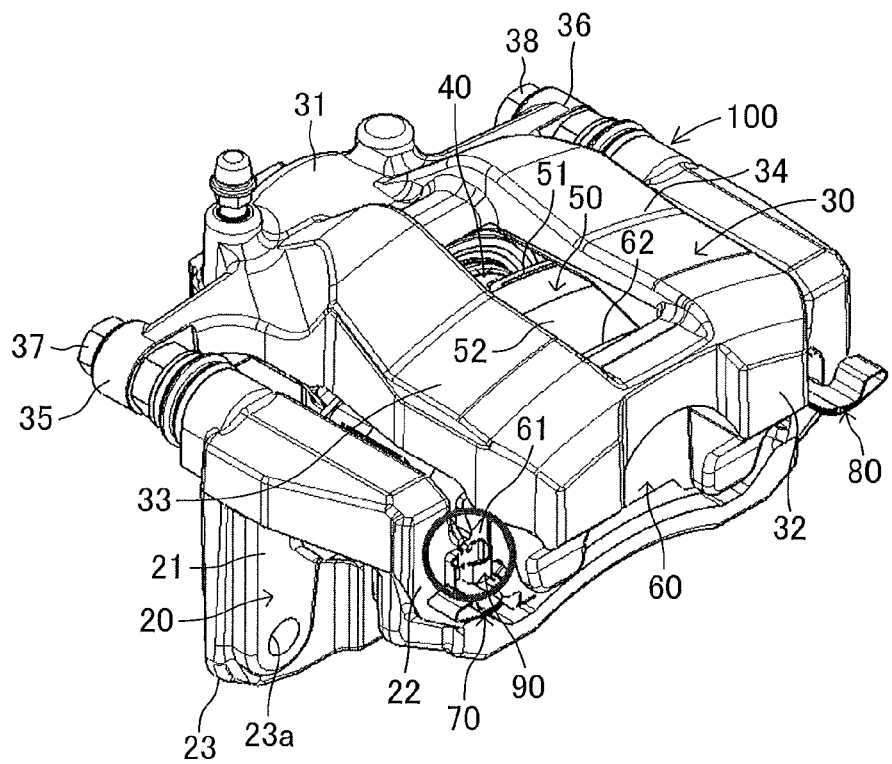
FIG. 2 Perspective view showing the disc brake apparatus shown in FIG. 1, as viewed from upper left of the apparatus in FIG. 1.

As shown in FIGS. 1 and 2, the support member 20 is provided in such a manner as to straddle a portion of the circumference of the disc rotor 10 and integrally includes an inner support portion 21 which supports the inner brake pad 50, and an outer support portion 22 which supports the outer brake pad 60. Furthermore, the support member 20 integrally includes a mounting portion 23 to be mounted to a vehicle body. The mounting portion 23 has a pair of mounting holes 23a and 23b.

As shown in FIGS. 1 and 2, the movable caliper 30 is provided in such a manner as to straddle a portion of the circumference of the disc rotor 10 and includes a cylinder portion 31 located on the inner side, a pressing arm portion 32 located on the outer side, and a pair of connection portions 33 and 34 for connecting the cylinder portion 31 and the pressing arm portion 32. Also, the movable caliper 30 includes a pair of support arm portions 35 and 36 provided on the inner side. The movable caliper 30 is attached to the support member 20 in such a manner as to be movable in the axial direction of the disc rotor 10, via connection pins (not shown) which extend in the axial direction of the disc rotor 10 and are attached to the support arm portions 35 and 36 by use of bolts 37 and 38, respectively.

As is well known, the piston 40 is attached to the cylinder portion 31 of the movable caliper 30 in a liquid-tight condition and in such a manner as to be slidable in the axial direction of the disc rotor 10, and is disposed in such a manner as to be able to press the inner brake pad 50 toward the disc rotor 10. In braking the rotation of the disc rotor 10, the piston 40 is pressed by means of hydraulic oil supplied from a brake master cylinder (not shown) into an oil chamber formed between the piston 40 and the cylinder portion 31, whereby the piston 40 can press the inner brake pad 50 toward the disc rotor 10 in the axial direction of the disc rotor 10. When the piston 40 presses the inner brake pad 50 toward and against the disc rotor 10, the pressing arm portion 32 of the movable caliper 30 presses the outer brake pad 60 toward and against the disc rotor 10.

The inner brake pad 50 includes the back plate 51, the lining 52 fixedly attached to the back plate 51, and a shim plate (not shown) attached to the back surface of the back plate 51. The inner brake pad 50 is disposed between the disc rotor 10 and the piston 40 and is attached to the support member 20 by means of the back plate 51 via the pad supports 70 and 80 in such a manner as to be movable in the axial direction of the disc rotor 10 and in the circumferential direction of the disc rotor 10.

The outer brake pad 60 includes the back plate 61, the lining 62 fixedly attached to the back plate 61, and a shim plate 63 attached to the back surface of the back plate 61. The outer brake pad 60 is disposed between the disc rotor 10 and the pressing arm portion 32 of the movable caliper 30 and is attached to the support member 20 by means of the back plate 61 via the pad supports 70 and 80 in such a manner as to be movable in the axial direction of the disc rotor 10 and in the circumferential direction of the disc rotor 10.

The pad supports 70 and 80 are attached to the inner support portion 21 and the outer support portion 22 of the support member 20, thereby supporting the brake pads 50 and 60 in such a manner that the brake pads 50 and 60 are movable in the axial direction of the disc rotor 10 and in the circumferential direction of the disc rotor 10, and elastically restricting the movement of the brake pads 50 and 60 in the radial direction of the disc rotor 10.

The plate spring 90 will be described while the plate spring 90 attached to the outer brake pad 60 is taken as an example. As shown in FIGS. 1 to 8, the plate spring 90 has a fixture portion 91 having a shape resembling the squarish letter U and elastically fixed to the back plate 61, and an extension portion 92 extending continuously from the fixture portion 91. The extension portion 92 includes an engagement subportion 92a engaged with the support member 20 at all times; a curved subportion 92b located between the engagement subportion 92a and the fixture portion 91; and a contact-engagement subportion 92c located between the curved subportion 92b and the fixture portion 91.

The contact-engagement subportion 92c is formed at the proximal end of the extension portion 92 in the proximity of the fixture portion 91. The contact-engagement subportion 92c is located a predetermined distance away from the back plate 61 when the back plate 61 is at a non-braking position (the position shown in FIGS. 3 and 6), and is elastically deformed together with the curved subportion 92b (see FIGS. 4 and 7) and comes into surface contact with the back plate 61 in a nonslip manner when the curved subportion 92b is elastically deformed by a predetermined amount from its non-braking condition as a result of the back plate 61 moving from the non-braking position toward the rotor-rotation trailing side and thus toward the support member 20. Thus, when the back plate 61 moves further toward the rotor-rotation trailing side and thus toward the support member 20 from the condition shown in FIGS. 4 and 7, only the curved subportion 92b is elastically deformed.

Figure 3:
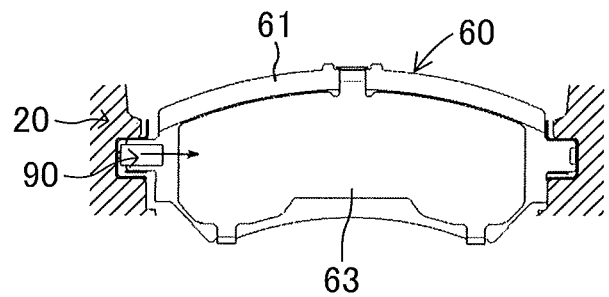
FIG. 3 Front view showing the relation among a mounting, an inner brake pad, a pad support, a plate spring, etc. shown in FIGS. 1 and 2, in a non-braking condition or in forward braking.
Figure 4:
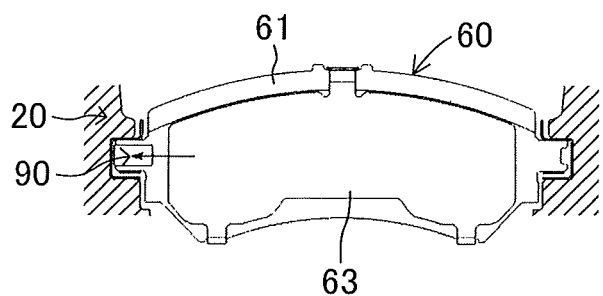
FIG. 4 Front view showing the relation among the mounting, the inner brake pad, the pad support, the plate spring, etc. shown in FIG. 3, in the early stage of backward braking.
Figure 5:
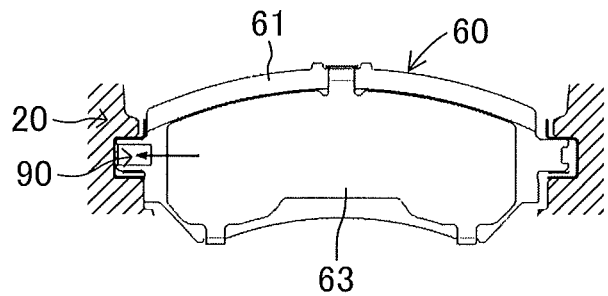
FIG. 5 Front view showing the relation among the mounting, the inner brake pad, the pad support, the plate spring, etc. shown in FIG. 3, in the latter stage of backward braking.
Figure 6:
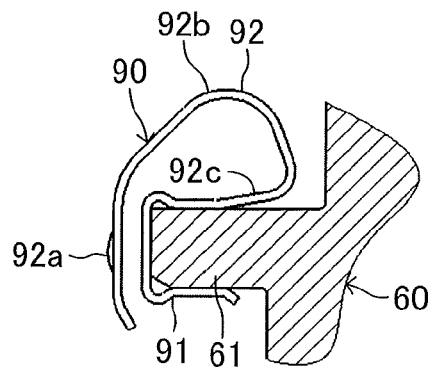
FIG. 6 Enlarged plan view showing the relation between the plate spring and a back plate of the inner brake pad shown in FIG. 3.
Figure 7:
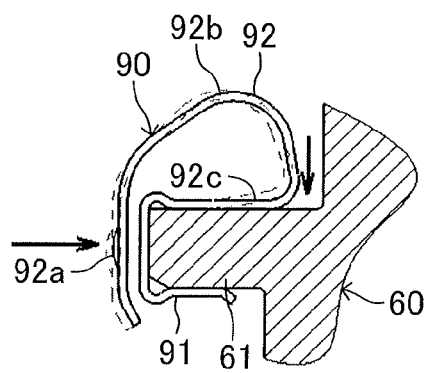
FIG. 7 Enlarged plan view showing the relation between the plate spring and the back plate of the inner brake pad shown in FIG. 4.
Figure 8:
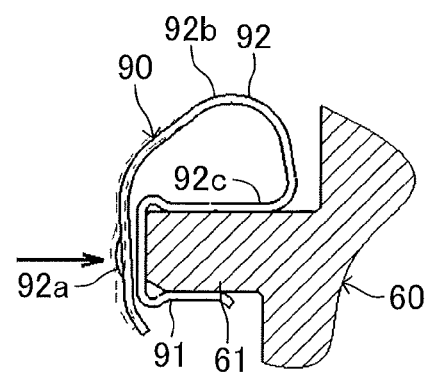
FIG. 8 Enlarged plan view showing the relation between the plate spring and the back plate of the inner brake pad shown in FIG. 5.
Figure 9:
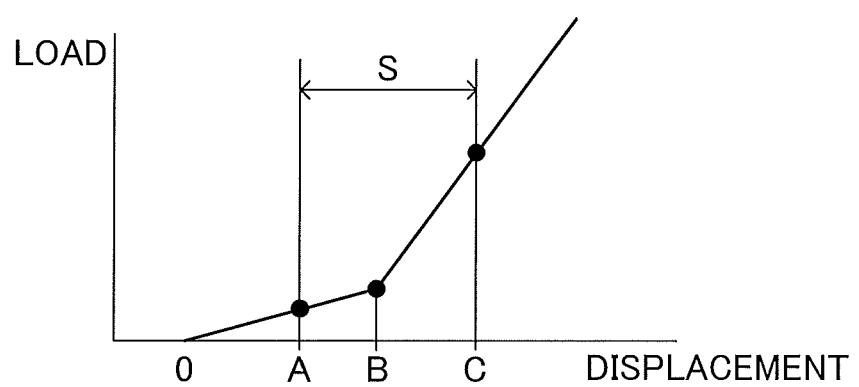
FIG. 9 Diagram showing the two-stage spring characteristic of the plate spring shown in FIGS. 1 to 8.

The plate spring 90 in the condition shown in FIGS. 3 and 6 is such that the curved subportion 92b and the contact-engagement subportion 92c are elastically deformed by a predetermined amount (see point A in FIG. 9) from a free condition (see point 0 in FIG. 9). The plate spring 90 in the condition shown in FIGS. 4 and 7 is such that the curved subportion 92b and the contact-engagement subportion 92c are elastically deformed by a predetermined amount from the condition shown in FIGS. 3 and 6 (see the broken line in FIG. 7) and such that the contact-engagement subportion 92c is in surface contact with the back plate 61 in a nonslip manner (see point B in FIG. 9). The plate spring 90 in the condition shown in FIGS. 5 and 8 is such that only the curved subportion 92b is elastically deformed by a predetermined amount from the condition shown in FIGS. 4 and 7 (see the broken line in FIG. 8), while the contact-engagement subportion 92c remains in surface contact with the back plate 61 in a nonslip manner (see point C in FIG. 9).

Thus, the plate spring 90 exhibits a two-stage spring characteristic as shown in FIG. 9 (i.e., a characteristic determined by its small spring constant which is represented between points A and B and is obtained through elastic deformation of the curved subportion 92b and the contact-engagement subportion 92c, and a characteristic determined by its large spring constant which is represented between points B and C and is obtained through elastic deformation of the curved subportion 92b only). The letter "S" in FIG. 9 indicates a stroke (a distance between points A and C) by which the back plate 61 of the outer brake pad 60 can move relative to the support member 20 in the circumferential direction of the disc rotor 10. At point A of FIG. 9, as shown in FIG. 3, an end portion of the back plate 61 located on the rotation leading side is in contact with the support member 20. At point C of FIG. 9, as shown in FIG. 5, an end portion of the back plate 61 located on the rotation trailing side is in contact with the support member 20.

In the thus-configured embodiment, in forward braking of a vehicle, the disc rotor 10 in forward rotation is gripped between the brake pads 50 and 60, whereby the rotation of the disc rotor 10 is braked. Thus, at this time, the brake pads 50 and 60 do not move toward the rotor-rotation trailing side for the forward rotation of the disc rotor 10, and the curved subportion 92b and the contact-engagement subportion 92c of the plate spring 90 are maintained in a non-braking condition.

In such a condition, as shown in FIGS. 3 and 6, since the contact-engagement subportion 92c of the plate spring 90 is located a predetermined distance away from the back plate 61 and is thus allowed to move freely (allowed to be elastically deformable), the plate spring 90 exhibits a characteristic determined by its small spring constant. Therefore, the sliding resistance of the brake pads 50 and 60 in the axial direction of the disc rotor 10 in forward braking is restrained to a low level.

Meanwhile, in backward braking of a vehicle subsequent to forward braking of the vehicle, since the disc rotor 10 rotating in the reverse direction is gripped between the brake pads 50 and 60 for braking the rotation, the brake pads 50 and 60 move toward the rotor-rotation trailing side for the forward rotation of the disc rotor 10. Thus, at this time, as a result of the movement of the brake pads 50 and 60, the curved subportion 92b and the contact-engagement subportion 92c of the plate spring 90 are elastically deformed sequentially from their non-braking conditions. When the curved subportion 92b and the contact-engagement subportion 92c of the plate spring 90 are elastically deformed by respectively predetermined amounts from their non-braking conditions, as shown in FIGS. 4 and 7, the contact-engagement subportion 92c, whose free movement has been allowed, of the plate spring 90 comes into surface contact with the back plate 61 in a nonslip manner, whereby the free movement of the contact-engagement subportion 92c is restricted.

Thus, subsequently, the plate spring 90 is deformed as follows: in a state in which the movement of the contact-engagement subportion 92c of the plate spring 90 is restricted by the back plate 61 (in a state in which the spring constant of the plate spring 90 is increased as compared with the case where the movement of the contact-engagement subportion 92c is not restricted by the back plate 61), only the curved subportion 92b of the plate spring 90 is elastically deformed. Accordingly, in the early stage of the backward braking, the plate spring 90 exhibits a characteristic determined by its small spring constant, whereby the sliding resistance of the brake pads 50 and 60 in the axial direction of the disc rotor 10 in braking can be restrained to a low level. In the latter stage of the backward braking, the plate spring 90 exhibits a characteristic determined by its large spring constant, whereby the generation of a contact noise (clonk noise), which results from the back plates 51 and 61 of the brake pads 50 and 60 coming into contact with the support member 20, can be effectively restrained.

In the disc brake apparatus 100 of the above-described embodiment, in backward braking subsequent to forward braking of a vehicle, the contact-engagement subportion 92c of the plate spring 90 which has been allowed to move freely comes into surface contact with the back plate 61 in a nonslip manner, whereby the free movement of the contact-engagement subportion 92c is restricted; i.e., the characteristic of the plate spring 90 is changed over from a characteristic determined by its small spring constant to a characteristic determined by its large spring constant. Meanwhile, even when oil or wear particles adhere to the contact-engagement subportion 92c of the plate spring 90, the contact-engagement subportion 92c yields an action and an effect similar to those yielded by the contact-engagement subportion 92c free from adhesion of oil and wear particles. Therefore, the plate spring 90 stably exhibits the two-stage spring characteristic, so that an expected action and an expected effect are yielded at all times.

In the above-described embodiment, the present invention is embodied through employment of the plate spring 90 shown in FIGS. 1 to 8. However, in place of the plate spring 90 shown in FIGS. 1 to 8, a plate spring 190 shown in FIGS. 10 to 12 can be employed in embodying the present invention. The plate spring 190 has a fixture portion 191 having a shape resembling the squarish letter U and elastically fixed to the back plate 61, and an extension portion 192 extending continuously from the fixture portion 191. The extension portion 192 includes an engagement subportion 192a engaged with the support member 20 at all times; a curved subportion 192b located between the engagement subportion 192a and the fixture portion 191; and a contact-engagement subportion 192c provided on the distal end side of the engagement subportion 192a of the extension portion 192.

The contact-engagement subportion 192c is located a predetermined distance away from the fixture portion 191 when the back plate 61 is at a non-braking position (the position corresponding to that in FIG. 3), and is elastically deformed together with the curved subportion 192b and comes into surface contact with the fixture portion 191 in a nonslip manner when the curved subportion 192b is elastically deformed by a predetermined amount from its non-braking condition (at the time of deformation corresponding to that in FIG. 4) as a result of the back plate 61 moving from the non-braking position toward the rotor-rotation trailing side and thus toward the support member 20. Thus, when the back plate 61 moves further toward the rotor-rotation trailing side and thus toward the support member 20 from the condition shown in FIG. 4, only the curved subportion 192b is elastically deformed.

Figure 10:
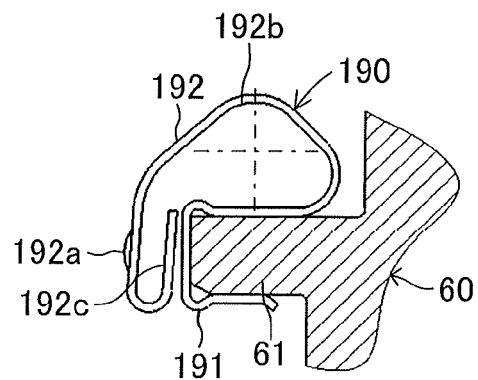
FIG. 10 En enlarged plan view, corresponding to FIG. 6, showing a modified embodiment of the plate spring.
Figure 11:
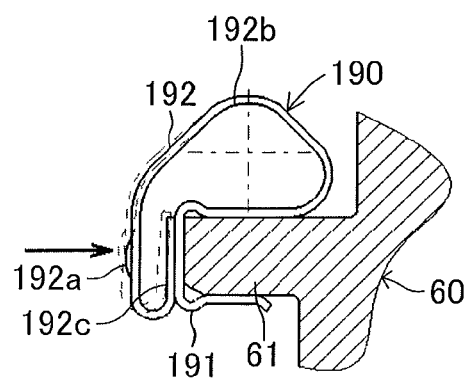
FIG. 11 Enlarged plan view, corresponding to FIG. 7, showing the modified embodiment of the plate spring.
Figure 12:
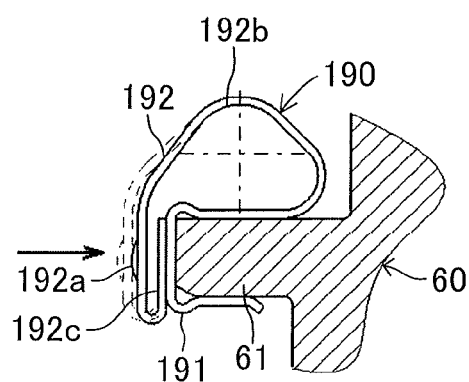
FIG. 12 Enlarged plan view, corresponding to FIG. 8, showing the modified embodiment of the plate spring.

The plate spring 190 in the condition shown in FIG. 10 is such that the curved subportion 192b and the contact-engagement subportion 192c are elastically deformed by a predetermined amount from a free condition. The plate spring 190 in the condition shown in FIG. 11 is such that the curved subportion 192b and the contact-engagement subportion 192c are elastically deformed by a predetermined amount from the condition shown in FIG. 10 (see the broken line in FIG. 11) and such that the contact-engagement subportion 192c is in surface contact with the fixture portion 191 in a nonslip manner. The plate spring 190 in the condition shown in FIG. 12 is such that only the curved subportion 192b is elastically deformed by a predetermined amount from the condition shown in FIG. 11 (see the broken line in FIG. 12), while the contact-engagement subportion 192c remains in surface contact with the fixture portion 191 in a nonslip manner.

Thus, the plate spring 190 exhibits a two-stage spring characteristic as shown in FIG. 9 (i.e., a characteristic determined by its small spring constant which is obtained through elastic deformation of the curved subportion 192b and the contact-engagement subportion 192c, and a characteristic determined by its large spring constant which is obtained through elastic deformation of the curved subportion 192b only).

Figure 13:
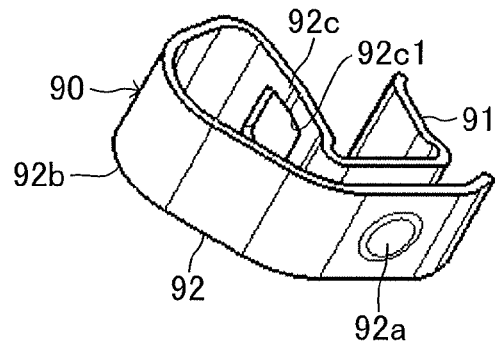
FIG. 13 Perspective view showing the plate spring shown in FIGS. 1 to 8 whose contact-engagement subportion has a pierced hole.
Figure 14:
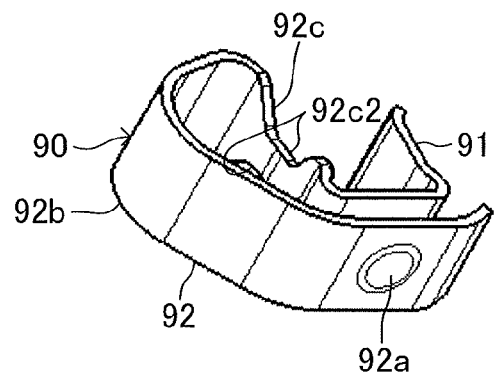
FIG. 14 Perspective view showing the plate spring shown in FIGS. 1 to 8 whose contact-engagement subportion has a pair of cutouts.
Figure 15:
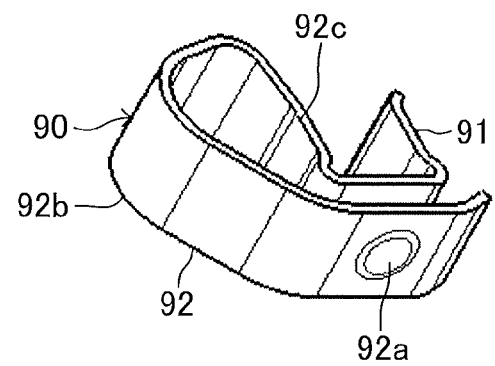
FIG. 15 Perspective view showing the plate spring shown in FIGS. 1 to 8 whose contact-engagement subportion does not have the pierced hole and the pair of cutouts.

In the embodiment described above with reference to FIGS. 1 to 9, as shown in FIG. 15, the contact-engagement subportion 92c of the plate spring 90 does not have a pierced hole, a cutout, and the like. However, the present invention can be embodied such that, as shown in FIG. 13, the contact-engagement subportion 92c of the plate spring 90 has a pierced hole 92c1, or such that, as shown in FIG. 14, the contact-engagement subportion 92c of the plate spring 90 has a pair of cutouts 92c2. In these cases, by means of changing the size of the pierced hole 92c1 or the cutouts 92c2 as appropriate, the small spring constant of the plate spring 90 (i.e., the characteristic determined by the small spring constant) can be easily changed, so that the two-stage spring characteristic of the plate spring 90 can be easily changed.

In the embodiments described above, the fixture portions 91 and 191 of the plate springs 90 and 190 have a shape resembling the squarish letter U and are elastically fixed to the back plate 61. However, the fixture portion of the plate spring can be fixed to the back plate by use of a fixture, such as a screw. Also, in the embodiments described above, the present invention is embodied in a movable-caliper-type disc brake apparatus for use in a vehicle. However, the present invention can be embodied similarly in a stationary-caliper-type disc brake apparatus for a vehicle.

The invention claimed is:

1. A disc brake apparatus comprising:
    a disc rotor which can rotate forward and in reverse unitarily with a wheel;
    a support member to be attached to a vehicle body;
    a pair of brake pads disposed in such a manner as to be able to grip the disc rotor therebetween and attached to the support member in such a manner as to be movable in an axial direction of the disc rotor and in a circumferential direction of the disc rotor;
    pressing members for pressing back plates of the brake pads toward the disc rotor;
    a plate spring which intervenes between the support member and an end portion of the back plate of each brake pad with respect to the circumferential direction of the disc rotor, the end portion being located on a rotor-rotation trailing side at the time of forward rotation of the disc rotor, and which urges the brake pad toward a rotor-rotation leading side at the time of forward rotation of the disc rotor;
    in braking, the pressing members pressing the brake pads toward the disc rotor, whereby linings of the brake pads are slidably pressed against braking surfaces of the disc rotor for braking rotation of the disc rotor;
    the plate spring has a fixture portion fixed to the back plate, and an extension portion which extends continuously from the fixture portion; and
    the extension portion comprising:
        an engagement subportion engaged with the support member at all times;
        a curved subportion located between the engagement subportion and the fixture portion;
        a contact-engagement subportion which is located a predetermined distance away from the back plate or the fixture portion when the back plate is at a non-braking position, and comes into surface contact with the back plate or the fixture portion in a nonslip manner when the curved subportion is elastically deformed by a predetermined amount from its non-braking condition as a result of the back plate moving, at the time of reverse rotation of the disc rotor, from the non-braking position toward the rotor-rotation trailing side and thus toward the support member; and
        wherein the contact-engagement subportion is spaced apart from the engagement portion and possesses an end adjoining the fixture portion.

2. A disc brake apparatus according to claim 1, wherein the contact-engagement subportion has a pierced hole or a cutout.

3. A disc brake apparatus for a vehicle, the disc brake apparatus comprising:
    a disc rotor rotatable in a forward direction and a reverse direction together with a wheel of the vehicle;
    a support member attachable to a body of the vehicle;
    brake pads configured to grip the disc rotor positioned between the brake pads, the brake pads being movable in an axial direction of the disc rotor and in a circumferential direction of the disc rotor;
    pressing members for pressing back plates of the brake pads toward the disc rotor;
    the back plate of each brake pad possessing an end portion positioned on a rotor-rotation trailing side at the time of forward rotation of the disc rotor;
    a plate spring positioned between the support member and the end portion of the back plate of each brake pad, the plate spring urging the brake pad toward a rotor-rotation leading side at the time of forward rotation of the disc rotor;
    during braking, the pressing members press the brake pads toward the disc rotor so that linings of the brake pads are slidably pressed against braking surfaces of the disc rotor for braking rotation of the disc rotor;
    the plate spring possesses a fixture portion fixed to back plate and an extension portion which extends continuously from the fixture portion; and
    the extension portion comprising:
        an engagement subportion engaged with the support member at all times;
        a curved subportion adjoining the engagement subportion and the fixture portion; and
        the engagement subportion turning back on itself to form a contact-engagement subportion positioned between the engagement portion and the back plate or the fixture portion; and
        wherein the contact-engagement subportion is configured to be spaced apart from the back plate or the fixture portion when the back plate is at a non-braking position, and configured to contact the back plate or the fixture portion in a nonslip manner when the curved subportion is elastically deformed by a predetermined amount from its non-braking condition as a result of the back plate moving, at the time of reverse rotation of the disc rotor, from the non-braking position toward the rotor-rotation trailing side and thus toward the support member.

4. The disc brake apparatus of claim 1, wherein the contact-engagement subportion possesses a different end adjoining the curved subportion.

5. The disc brake apparatus of claim 3, wherein the contact-engagement subportion includes oppositely facing first and second side surfaces, the first side surface facing the engagement subportion, and the second side surface facing the fixture portion or the back plate.

* * * * *